United States Patent Office 3,347,681
Patented Oct. 17, 1967

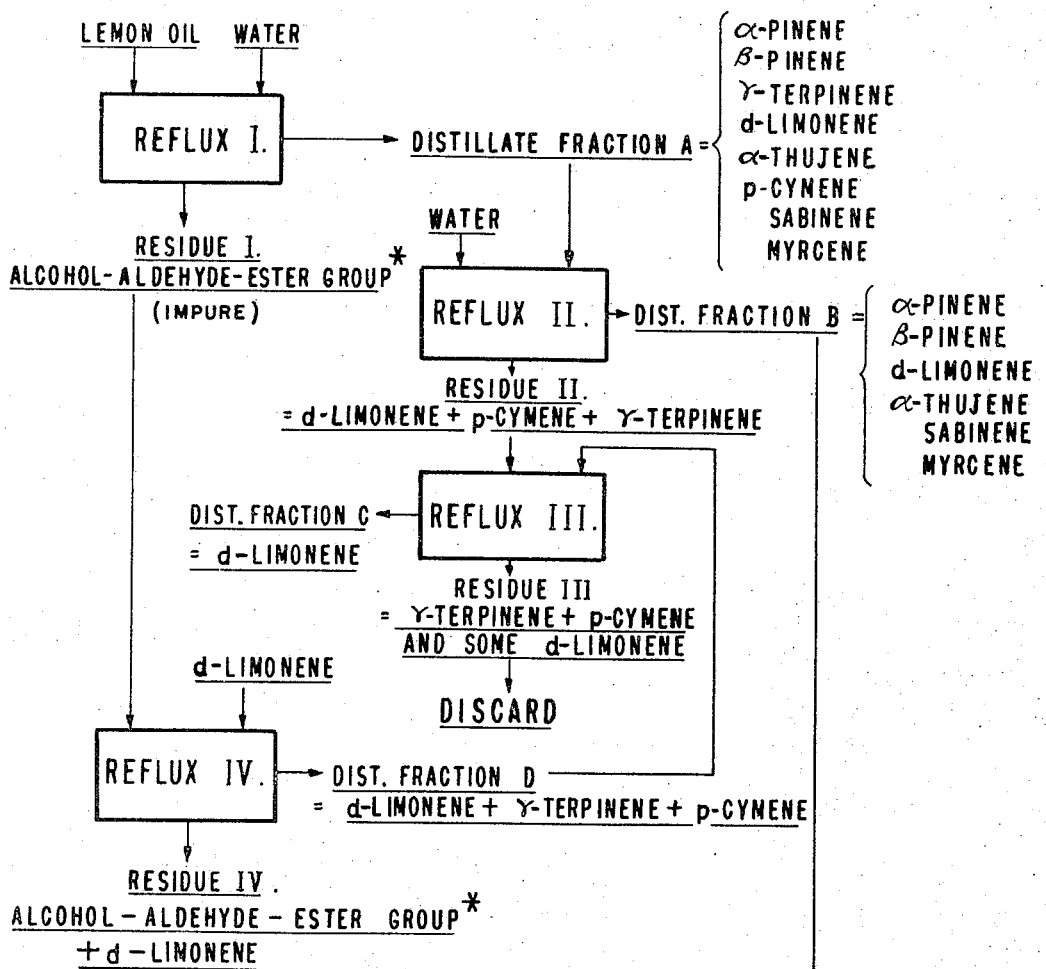

3,347,681
PROCESS FOR PREPARING A LEMON
FLAVORING OIL COMPOSITION
William C. Platt, Ventura, Calif., assignor to Ventura
Processors, Ventura, Calif., a corporation of California
Filed Aug. 27, 1962, Ser. No. 222,752
3 Claims. (Cl. 99—140)

This application is a continuation-in-part of my application Ser. No. 151,670 filed Nov. 13, 1961, now abandoned.

This invention relates to a lemon flavoring oil composition which has high stability of pure lemon flavor, and to a process for producing the new composition.

Lemon oil is a well-known "essential oil" derived from lemons, and is a mixture of many separate and distinct chemical compounds including hydrocarbons, alcohols, aldehydes, and esters, some of which impart flavor and odor, and some of which are low in flavor and odor imparting qualities. Those chemical compounds in the mixture which have been identified are named herein.

Lemon oil, and lemon oil flavored food products which have been stored for some time, are known to develop an undesirable odor and flavor which may be generally described as "musty." Efforts to further refine natural lemon oil to overcome the subsequently developed musty odor and flavor have failed because the refining treatment has always resulted in the removal of some part of the true composite lemon flavor. For example, the "washing process" long used by the carbonated beverage industry, in which some of the terpenes are removed by extracting natural lemon oil with alcohol-water solutions, results in an altered lemon flavor and odor, and in addition the losses of material are relatively high. Vacuum fractional distillation as ordinarily carried out is not very effective because at the very low pressures required (whereby to keep the temperature low to prevent off-flavors) the boiling points of the ingredients of lemon oil are so close together that sharp separations are difficult.

The object of this invention is to provide a composition which may be used as a concentrated source of lemon oil flavor but which when so used, over a period of storage time as a flavor in foods, does not develop any objectionable musty odor or flavor, and to the process of making such a composition from pure lemon oil as the source material.

I have discovered that a lemon flavoring oil composition which does not contain gamma terpinene does not, when used in the usual manner for flavoring of pure lemon oil, develop the undesired musty odor and flavor. I have further discovered that all of the gamma terpinene may be completely removed from natural lemon oil by first separating, by vacuum fractional distillation under suitable conditions in the presence of water, (I), the terpene hydrocarbons group of ingredients including some d-limonene, from the (II) alcohol-aldehyde-ester group of ingredients; and from this terpene hydrocarbons fraction, the gamma terpinene and the para-cymene can be separated out, by further vacuum fractional distillation in the presence of water, from the other terpene hydrocarbons group ingredients, and then, using recirculated d-limonene in a co-distillation, eventually recovering most of the d-limonene, and discarding most of the gamma terpinene along with para-cymene; following which separations, the alcohol-aldehyde-ester group fractions, plus some of the d-limonene, and plus the terpene hydrocarbons group fractions (minus the para-cymene and gamma terpinene ingredients) are mixed together to give a lemon flavoring oil composition which has flavor stability. In particular I have discovered that gamma terpinene and para-cymene may be substantially completely removed from the alcohol-aldehyde-ester group fraction by continuously or repeatedly co-distilling off d-limonene, para-cymene and gamma terpinene after adding a make up of pure d-limonene to the alcohol-aldehyde-ester group fraction.

Para-cymene is present in very small proportion in natural lemon oil, (about 0.01 percent), and has relatively little flavor or odor effect of its own, but it follows the gamma-terpinene in the process of this invention because of its close boiling point under vacuum distillation.

Where the term "alcohol-aldehyde-ester group" is used in this specification and the claims it is intended to include the alcohol, aldehyde, and ester compounds in lemon oil.

The ingredients of lemon oil in this group are linalool, alphaterpineol, terpinene-1-ol, terpinene-4-ol, nerol, geraniol, actylacetate, nonylacetate, ethylcaproate, linalylacetate, citronellylacetate, geranylacetate, citronellal, neral, geranial, saturated aliphatic straight-chain $C_7$ to $C_{17}$ aldehydes. Neral and geranial together are commonly called citral.

Where the term "terpene hydrocarbons group" is used herein and in the claims, it is meant to include alpha-pinene, beta-pinene, gamma-terpinene, dextro-limonene, alpha-thujene, para-cymene, sabinene, and myrcene.

A drawing showing diagrammatically the process of this invention is presented herewith, in which FIG. 1 is a diagrammatic flow sheet of the process; and FIG. 2 is a list of ingredients included in the term "Alcohol-Aldehyde-Ester Group" as used in FIG. 1.

In my new process, as illustrated in the Diagram I, I first separated pure lemon oil into the alcohol-aldehyde-ester group ingredients (residue I) from the terpene hydrocarbons group (fraction A) by vacuum fractional distillation in the presence of water (Reflux I) followed by a second vacuum fractional distillation (Reflux II) of the terpene hydrocarbons group (fraction A) to separate the para-cymene and the gamma-terpinene. In this second fractional distillation, which is also carried on in the presence of water, the alpha and beta pinene and some of the d-limonene (and also the lesser terpene hydrocarbons alpha thujene, sabinene, and myrcene) are distilled over (fraction B) leaving a residue (Residue II) which consists essentially of d-limonene, para-cymene and gamma-terpinene. From the residue (II) from the second distillation (Reflux II) substantially pure d-limonene may be recovered by further fractional vacuum distillation (Reflux III), with the para-cymene, gamma-terpinene and a small proportion of d-limonene remaining in the still; this is discarded. Some or all of the pure d-limonene (fraction C) is then added to the residue (Residue I) left in the still from the original distillation (Reflux I) of the lemon oil and as a result of another vacuum fractional distillation (Reflux IV), the para-cymene and gamma-terpinene with d-limonene is distilled over (fraction D) and this is returned to Reflux III, and the residue (IV) in the still contains all of the alcohol-aldehyde-ester group ingredients, as shown in FIG. 2, and the major portion of the d-limonene. By then mixing the terpene hydrocarbons group fraction (B) from the second distillation (Reflux II) with the alcohol-aldehyde-ester group ingredients and the d-limonene (Residue IV), a flavor-stable concentrated lemon flavoring oil composition is produced.

The vacuum fractional distillation equipment used consisted of a flask heated with an electric mantle and equipped with a fractionation column packed with stainless steel wire gauze cylinders. A still head was provided with means for controlling the fractionation ratios, and a condenser and vacuum pump were operatively attached to the equipment. Other suitable equipment set-ups to attain the desired fractionation controls may also be employed.

Illustrating my invention, a quantity of lemon oil having an approximate composition in the major ingredients of the volatile portion, by volume, of 2 percent alpha-pinene, 18 percent beta-pinene, 66 percent d-limonene, 11 percent gamma-terpinene and para-cymene, and 3 percent of the alcohol-aldehyde-ester group ingredients, was treated in the equipment described above. One hundred parts by volume of the lemon oil were placed in the still flask with approximately 300 parts by volume of water. The distillation equipment was then evacuated to approximately 26 inch vacuum, which resulted in a boiling point of about 115° F. in the flask. After equilibrium had been established, the still head control was adjusted to remove one part of distillate to seven parts by volume return to the fractionation column. The distillation (Reflux I) was continued until withdrawn distillate samples indicated that about one-tenth percent of the alcohol-aldehyde-ester group were contained in the withdrawn sample. The first collected portion of the distillate amounting to about 40 parts by volume contained all of the alpha- and beta-pinene and some d-limonene, with traces of gamma-terpinene and the lesser terpene hydrocarbon group. The reflux ratio was then increased so that one part in ten distilled over and the remainder was returned to the fractionation column. This second portion of the distillate amounted to about 30 parts and contained mostly d-limonene and some gamma-terpinene and para-cymene. Samples were continuously taken and analyzed so that the distillation could be discontinued when the alcohol-aldehyde-ester group ingredients started to distill over. The residue in the still contained substantially all of the alcohol-aldehyde-ester group ingredients, some d-limonene, some para-cymene and gamma-terpinene.

The two terpene hydrocarbon fractions above described, along with about double the volume of water, were then placed in a similar still, and fractionally distilled (Reflux II) under vacuum at a temperature of about 115° F. with a high reflux ratio of 15 parts returned to the fractionation column to one part distilled over. The first fractions removed contained substantially all of the alpha- and beta-pinene (and the lesser terpene fractions exclusive of para-cymene and gamma-terpinene) with traces of d-limonene, and this was separately collected. The distillation was then continued (Reflux III) with the same reflux ratio of 15 to one, and the collected distillate was practically pure d-limonene, with the para-cymene, gamma-terpinene and a small proportion of d-limonene remaining in the flask. The stopping point of this distillation was determined by continuously sampling the distillate, and when the content of gamma-terpinene started to increase, the distillation was discontinued.

The substantially pure d-limonene collected from the last described distillation was then placed in the still with the alcohol-aldehyde-ester group ingredients and water from the first treatment of the lemon oil. This mixture was then subjected to vacuum fractional distillation at about 115° F. by which the distillate, using a reflux ratio of 10 to 1, contained some d-limonene and substantially all of the remaining para-cymene, and gamma-terpinene. The still then contained only the alcohol-aldehyde-ester group ingredients and d-limonene; this residue (IV) was then mixed with the terpene hydrocarbons fraction (b) from which the para-cymene and gamma-terpinene had been removed (as described earlier) to give a substantially para-cymene-free and gamma-terpinene-free composition. This concentrated lemon flavoring oil composition supplies substantially all of the flavor and odor characteristics of the original oil but does not develop the characteristic after-use musty odor of pure lemon oil. If all of the collected d-limonene is returned to the Reflux IV, then the new flavoring composition contains only about 75 percent of the d-limonene based upon the original d-limonene content of the natural lemon oil, and none of the para-cymene and gamma-terpinene. The distillate fraction D may be added to Reflux III to more completely recover the d-limonene. Lesser proportions of d-limonene may be returned to Reflux IV, resulting in a more concentrated flavoring composition.

While I have described one illustrative and typical operation in which the para-cymene and the gamma-terpinene were removed from a certain batch of natural lemon oil, I do not wish to be limited to the exact fractionation ratios, since the lemon oil which is originally treated may vary in the proportions of the many chemical compounds in its composition, and hence may require some variations in the treatment to produce the new flavoring composition. The analysis of the samples of distillate taken from time to time at different stages of the process permit the control of the details of the operation so that para-cymene and gamma-terpinene are substantially all removed and the other ingredients of natural lemon oil are all retained with the exception of a proportion of d-limonene which is removed and discarded with the para-cymene and the gamma-terpinene. The proportion of d-limonene retained may be controlled as desired, that is, more than the above indicated 75 percent of the original content may be retained under some circumstances, or pure d-limonene may be separated out and otherwise used.

The concentrated lemon flavored oil composition of this invention may be used for flavoring food products without any danger of the subsequent development of the musty odor or flavor.

The objectives stated at the beginning have been attained.

I claim:
1. A process for removing gamma-terpinene and para-cymene from lemon oil comprising the steps of separating by vacuum fractional distillation from a mixture of lemon oil and water, a first distillate consisting of the terpene hydrocarbons group ingredients including d-limonene, from a residue consisting of the alcohol-aldehyde-ester group ingredients; separating out from said terpene hydrocarbons group ingredients, with water, by vacuum fractional distillation, gamma-terpinene, para-cymene, and a part of the d-limonene from the other terpene hydrocarbons group ingredients; forming a third mixture consisting of the said alcohol-aldehyde-ester group ingredients and purified d-limonene; separating out of said mixture by vacuum fractional distillation a distillate fraction containing gamma-terpinene, para-cymene and some d limonene from said alcohol-aldehyde-ester group ingredients and some d-limonene; continuing adding pure d-limonene to said alcohol-aldehyde-ester group ingredients and continuing fractionally distilling off d-limonene, para-cymene and gamma-terpinene until substantially all of said gamma-terpinene has been removed; and then mixing together said alcohol-aldehyde-ester group ingredients and d-limonene free from para-cymene and gamma-terpinene, with said other terpene hydrocarbons group ingredients free from gamma-terpinene and para-cymene to give a concentrated lemon flavoring oil composition.

2. In the process for removing gamma-terpinene from lemon oil the steps consisting of separating by vacuum fractional distillation from a mixture of lemon oil and water, a first distillate consisting of the terpene hydrocarbons group ingredients including d-limonene, and a residue consisting of the alcohol-aldehyde-ester group ingredients; forming a mixture consisting of the said alcohol-aldehyde-ester group ingredients and purified d-limonene; separating out by vacuum fractional distillation of said mixture a distillate fraction containing gamma-terpinene, para-cymene and some d-limonene, and a residue consisting of said alcohol-aldheyde-ester group ingredients and some d-limonene.

3. In the process for removing gamma terpinene from a lemon oil fraction containing alcohol-aldheyde-ester group ingredients and containing small proportions of gamma-terpinene, the steps of repeatedly adding pure d-limonene to said fraction, and fractionally vacuum co-distilling off a distillate of gamma-terpinene and some d-limonene until substantially all of the gamma-terpinene has been removed.

References Cited

UNITED STATES PATENTS

| | | | |
|---|---|---|---|
| 2,712,008 | 6/1955 | Kirchner et al. | 260—236.6 |
| 2,790,719 | 4/1957 | Glickman | 99—140 |
| 3,034,902 | 5/1962 | Bavisotto | 99—140 |
| 3,037,975 | 6/1962 | Cohn | 260—236.6 |
| 3,294,550 | 12/1966 | Ikeda et al. | 99—140 |

OTHER REFERENCES

Guenther: The Essential Oils, vol. II (1949), page 41.

Ikeda et al.: Food Technology, vol. 15 (1961), pages 379–380.

Pinder: The Chemistry of the Terpenes, Chapman and Hall, London (1960), pages 1–4, 45 and 46.

RAYMOND N. JONES, Primary Examiner.

BEATRICE H. STRIZAK, WALTER A. MODANCE, A. LOUIS MONACELL, Examiners.

J. A. PATTEN, J. M. GOLIAN, Assistant Examiners.